(12) United States Patent
Perreault (10) Patent No.: US 7,773,322 B2
(45) Date of Patent: Aug. 10, 2010

(54) SYSTEMS AND METHODS FOR MOVING A LENS USING SHAPE MEMORY MATERIALS

(75) Inventor: Daniel C. Perreault, Everett, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 11/942,521

(22) Filed: Nov. 19, 2007

(65) Prior Publication Data

US 2009/0128926 A1    May 21, 2009

(51) Int. Cl.
G02B 7/02    (2006.01)
(52) U.S. Cl. ....................... 359/824; 359/822
(58) Field of Classification Search ......... 359/694–701, 359/819–824, 829, 830; 60/527–529
See application file for complete search history.

(56) References Cited

U.S. PATENT DOCUMENTS

| | | | |
|---|---|---|---|
| 4,860,040 A * | 8/1989 | Tamamura et al. ............ 396/89 |
| 5,005,956 A * | 4/1991 | Kaneda et al. ............... 359/698 |
| 5,973,857 A * | 10/1999 | Kaneda ....................... 359/701 |
| 6,134,057 A * | 10/2000 | Ueyama et al. .............. 359/821 |
| 6,141,158 A * | 10/2000 | Kaneda ....................... 359/696 |
| 7,133,077 B2 | 11/2006 | Higuma et al. | |
| 7,256,518 B2 | 8/2007 | Gummin et al. | |
| 7,481,054 B2 * | 1/2009 | Hageman et al. .............. 60/527 |

OTHER PUBLICATIONS

Otsuka, K. et al. (Ed.), "Shape Memory Materials," 1998, pp. 1-26, 27-48, 49-96 and 184-202, Cambridge University Press, Cambridge, UK.

* cited by examiner

*Primary Examiner*—Mohammed Hasan
(74) *Attorney, Agent, or Firm*—Seed IP Law Group PLLC (57) ABSTRACT

An imaging apparatus comprises an image pickup and a lens. A shape memory actuator is coupled to the lens and configured to move the lens relative to the image pickup.

28 Claims, 6 Drawing Sheets

SYSTEMS AND METHODS FOR MOVING A LENS USING SHAPE MEMORY MATERIALS

BACKGROUND

1. Technical Field

This description generally relates to the field of imaging apparatuses, and more particularly to moving lenses within imaging apparatuses.

2. Description of the Related Art

Modern imaging apparatuses (e.g., video cameras, digital cameras, camera cell phones, etc.) typically include from two to upwards of ten lenses that may be moved independently of one another in order to zoom, focus, and capture a desired image. The lenses may focus the image onto a variety of image pickup devices, such as charge-coupled devices (CCDs), photographic film, or analog tape media.

In many imaging apparatuses, a number of motors automatically drive the lenses in response to signals from control circuitry. Such motors are often compact conventional motors miniaturized for this application. Unfortunately, such motors suffer from a variety of drawbacks. Miniaturized conventional motors are slow, expensive, complex, require external encoder systems to achieve high accuracy, and are difficult to make highly reliable. Conventional motors may also be subject to some degree of gear lash and may have critical limitations regarding positional repeatability.

There is, therefore, a need to develop improved mechanisms for moving lenses within imaging apparatuses.

BRIEF SUMMARY

In one embodiment, an imaging apparatus comprises: an image pickup; a lens; and at least one actuator coupled to the lens and configured to move the lens relative to the image pickup, the at least one actuator being comprised of a shape memory material.

In another embodiment, a method of operating an imaging apparatus comprises: pointing an imaging apparatus towards a target object; actuating at least one actuator comprising a shape memory material to move a lens within the imaging apparatus; and generating an image including the target object.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with cameras and other imaging apparatuses, lens systems, control circuitry, integrated circuits, shape memory materials, and electronic drivers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract provided herein are for convenience only and do not interpret the scope or meaning of the embodiments.

Description of an Exemplary Imaging Apparatus

Figure 1:
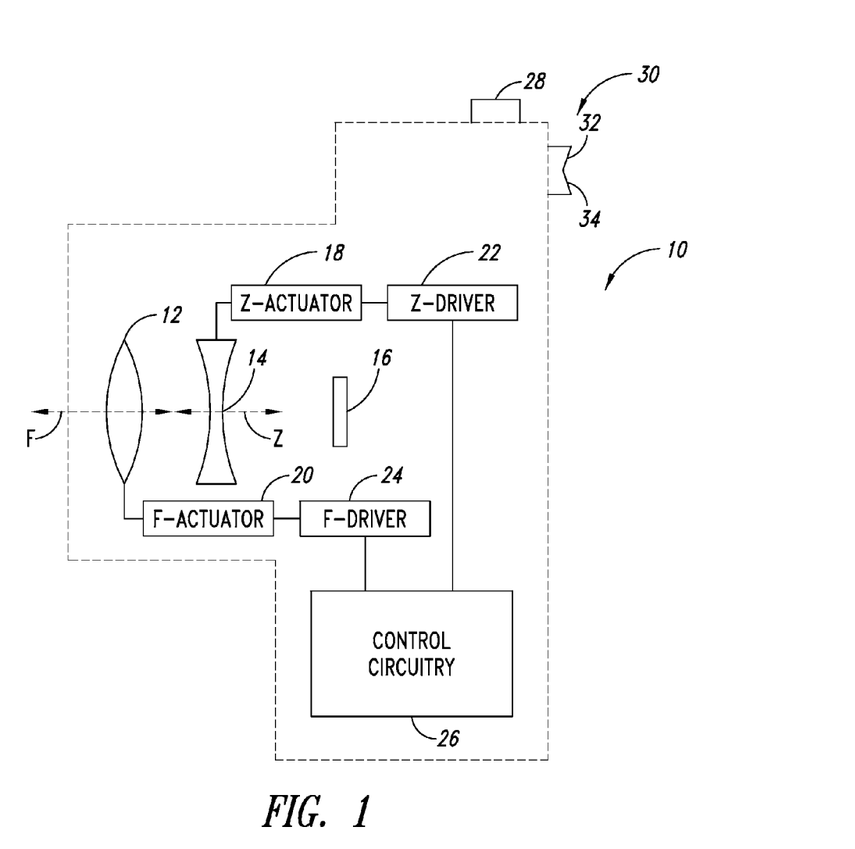
FIG. 1 is a schematic view of an imaging apparatus including at least one shape memory actuator, according to one illustrated embodiment.

FIG. 1 is a schematic view of an imaging apparatus 10 in which embodiments described herein may be implemented. As illustrated, the imaging apparatus 10 comprises a digital camera. However, it may be understood that any apparatus for producing an image may be used. For example, analog cameras, video cameras (both analog and digital), camera cell phones, computer-driven vision systems, medical imaging systems, telescopes, analog and digital binoculars, rifle scopes, and other imaging apparatuses may also be used.

In one embodiment, the imaging apparatus 10 comprises two lenses, a focus lens 12 and a zoom lens 14, which are configured to produce an image on an image pickup 16. Of course, in other embodiments, more or fewer lenses may be incorporated into the imaging apparatus 10 to produce an image. For example, in camera cell phones and other relatively simple imaging apparatuses lacking zoom capability, a single focus lens may be used. In other embodiments, more lenses may be used to achieve improved focus across a wider range of distances. The lens configuration within the imaging apparatus 10 may, therefore, be varied according to the apparatus' optical requirements.

The image pickup 16 may comprise any of a variety of structures configured to receive an image generated by the lenses 12, 14. In one embodiment, the image pickup 16 comprises a charge-coupled device (CCD) or a complementary metal-oxide semiconductor (CMOS) configured to photoelectrically convert incoming light into electrical signals. In another embodiment, the image pickup may comprise analog photographic film. In yet another embodiment, the image pickup may comprise analog or digital tape media for recording video.

Although the imaging apparatus 10, as illustrated, includes only three optical components, it may be understood that other optical components have not been shown in FIG. 1 for the sake of clarity. For example, the imaging apparatus 10 may include a stop or adjustable aperture to adjust an amount of light striking the image pickup 16, a shutter to enable a timed exposure for the image pickup 16, etc.

In one embodiment, the imaging apparatus 10 may also include user input components for receiving commands from a user. As illustrated, the imaging apparatus 10 may include a shutter button 28 configured to actuate a shutter (mechanically or electronically) within the imaging apparatus 10. The imaging apparatus 10 may also include a zoom selector 30 configured to adjust an optical zoom of the imaging apparatus 10. As illustrated, the zoom selector 30 may comprise a switch having a forward zoom selector 32 for "zooming in" and a rearward zoom selector 34 for "zooming out." Of course, the imaging apparatus 10 may also have other user input components, such as a power button, menu buttons and selectors, a manual focus interface, etc.

In one embodiment, the imaging apparatus 10 includes a Z-actuator system 18 coupled to the zoom lens 14 and configured to move the zoom lens 14 along an axis Z relative to the image pickup 16. The Z-actuator system 18 may comprise at least one actuator comprised of a shape memory material (i.e., a shape memory actuator). The imaging apparatus 10 may also include an F-actuator system 20 coupled to the focus lens 12, and configured to move the focus lens 12 along an axis F relative to the image pickup 16. In one embodiment, the F-actuator system 20 may also comprise at least one actuator comprised of a shape memory material. As illustrated, the axis F and the axis Z are aligned in order to focus an image through the zoom lens 14 and the focus lens 12 onto the image pickup 16.

A variety of shape memory materials may be used in either of the actuator systems 18, 20. As used herein, shape memory materials refer to materials that, after being deformed, can recover an original shape when actuated. Such materials may often be cycled between the deformed shape and the original shape by appropriate stimuli.

In embodiment, actuators in the actuator systems 18, 20 may include, for example, metal alloys, such as Ni—Ti, Au—Cd, In—Ti, Cu—Zn or Cu—Al—Ni. Such metal alloys may be cycled thermally or via stress. In another embodiment, ceramic-based shape memory materials may be used, such as $Pb(Zr,Ti)O_3$. Such ceramic-based shape memory materials may be cycled using external electric fields. In still other embodiments, shape memory plastics may be used. Such plastics may be cycled thermally or even when struck by light of particular wavelengths. A variety of shape memory materials may be used and combined to form the shape memory actuators within either of the actuator systems 18, 20.

Although illustrated as separate actuator systems, the Z-actuator system 18 and the F-actuator system 20 may, in one embodiment, form a single, continuous actuator system. In another embodiment, the Z-actuator system 18 and the F-actuator system 20 may comprise separate actuator systems but may be formed on a common substrate. In still other embodiments, the Z-actuator system 18 and the F-actuator system 20 may be completely independent.

The Z-actuator system 18 may comprise a plurality of shape memory actuators coupled together in an in-line or overlapping configuration, as will be discussed in greater detail below. These shape memory actuators may be formed from the same or different shape memory materials, and, in some embodiments, the Z-actuator system 18 may include conventional actuators in addition to the shape memory actuators. The F-actuator system 20 may also comprise a plurality of shape memory actuators coupled together in an in-line or overlapping configuration. The F-actuator system 20 and the Z-actuator system 18 may be similarly configured in some embodiments, although in other embodiments, the different requirements of the two actuator systems 18, 20 may call for different configurations.

As illustrated, a Z-driver 22 is coupled to the Z-actuator system 18 and an F-driver 24 is coupled to the F-actuator system 20. Each of these drivers 22, 24 may comprise circuitry configured to actuate at least one shape memory actuator of a respective actuator system. For example, in one embodiment, an actuator may be cycled thermally by ohmic heating generated by the corresponding driver. In another embodiment, an actuator may be cycled by an electric or magnetic field generated by the corresponding driver. In yet another embodiment, one or more light sources (e.g., lasers) may be activated by a driver to cycle one of the actuators.

Depending on the type of shape memory actuators controlled by the drivers 22, 24, each of the drivers 22, 24 may include different circuitry. Although not shown, each of the drivers 22, 24 may be coupled to and receive power from a power source (e.g., a battery, a super- or ultra-capacitor or fuel cell), indirectly or directly.

In one embodiment, the imaging apparatus 10 may further include control circuitry 26. The control circuitry 26 may be coupled to each of the drivers 22, 24 and may be configured to control movement of the lenses 12, 14 by controlling the actuator systems 18, 20 via the drivers 22, 24. In one embodiment, the control circuitry 26 may comprise one or more logic processing units, such as one or more central processing units (CPUs), digital signal processors (DSPs), application-specific integrated circuits (ASICs), field programmable gate arrays (FPGAs), etc. The control circuitry 26 may be configured to execute firmware/software instructions, or hardwired, logic-defined functions. Such instructions may be stored in a memory (not shown) also located within the imaging apparatus 10.

The control circuitry 26 may, in one embodiment, receive user input and perform a variety of functions based on that user input. For example, triggering the shutter button 28 may cause an electrical or optical signal to be sent to the control circuitry 26. The control circuitry 26 may then control a number of activities within the imaging apparatus 10 (e.g., focusing, opening a shutter, etc.) that culminate in the creation of an image. As another example, actuating the zoom selector 30 may send another electrical or optical signal to the control circuitry 26. Based on the received signal, the control circuitry 26 may calculate a target movement distance for the zoom lens 14. The control circuitry 26 may then move the zoom lens 14 by the target movement distance using the Z-driver 22 and the Z-actuator system 18.

Of course, the control circuitry 26 may control a variety of other functions within the imaging apparatus 10. In one embodiment, the control circuitry 26 may include active autofocus functionality for controlling an active autofocus system (not shown) in the imaging apparatus 10. Active autofocus systems may make an autofocus determination by causing a signal (e.g., an electromagnetic signal, a sound wave, etc.) to be emitted from the imaging apparatus 10, detecting a reflected signal, and determining an approximate distance between the imaging apparatus 10 and a target object based on the reflected signal. In one embodiment, the control circuitry 26 may control such an active autofocus system, and, based at least in part on the determined distance to the target object, the control circuitry 26 may be configured to calculate a movement distance/location for the focus lens 12. For example, the control circuitry 26 may determine that a target object is approximately 10 feet away, and, based on a table or based on equations stored on memory within the imaging apparatus 10, the control circuitry 26 may determine that the focus lens 12 should be moved 2 mm away from the image pickup 16.

In another embodiment, the control circuitry 26 may include passive autofocus functionality for implementing a passive autofocus system. Passive autofocus systems may make an autofocus determination by computer analysis of an image. Such computer analysis may include determining whether or not a target object is in focus by any of a variety of algorithms (e.g., by measuring contrast between features of the target object). In one embodiment, the control circuitry 26 may analyze an image and may determine, based at least in part on that computer analysis, whether or not to move the focus lens 12 to bring a target object into focus. The control circuitry 26 may then move the focus lens 12 in a feedback loop to achieve a focused image.

Description of One Exemplary Shape Memory Actuator System

Figure 2:
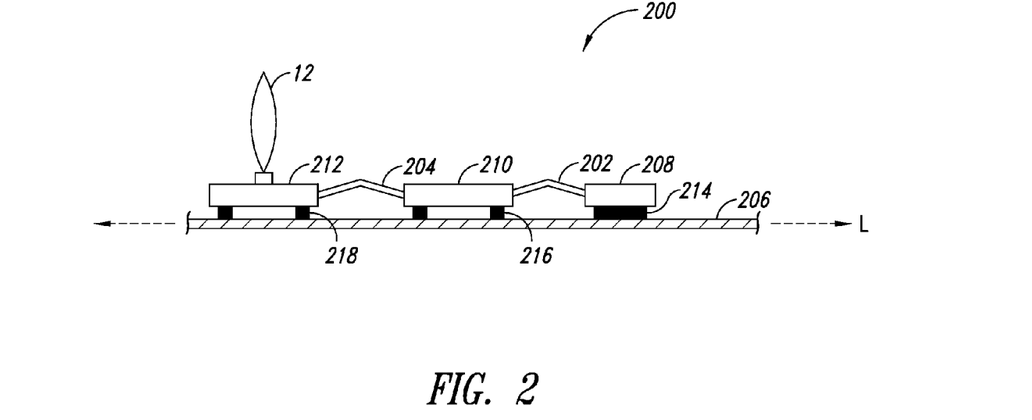
FIG. 2 is a side schematic view of a shape memory actuator system coupled to a lens, according to one illustrated embodiment.
Figure 3:
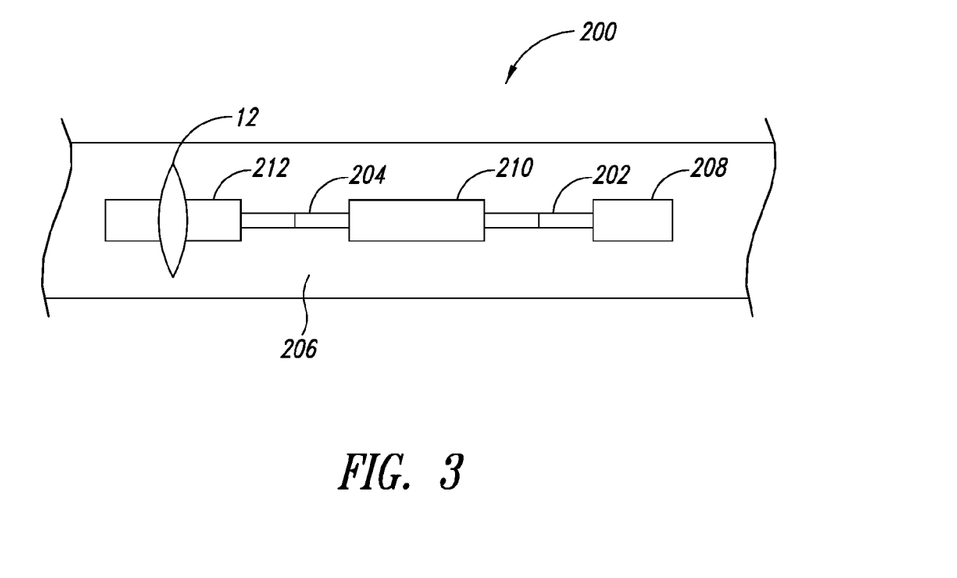
FIG. 3 is a top view of the shape memory actuator system of FIG. 2.

As illustrated in FIG. 2, in one embodiment, an actuator system 200 may comprise two actuators 202, 204 arranged in-line on a substrate 206. FIG. 3 is a top view of the actuator system 200. Although illustrated as coupled to the focus lens 12 in FIG. 2, the actuator system 200 may be used to implement either the F-actuator system 20, the Z-actuator system 18, or both. The actuator system 200 may comprise more or fewer actuators to achieve a desired range of motion for a particular optical system. In addition, more or fewer actuators may be used to achieve a desired granularity of movement.

The substrate 206 may comprise any frame upon which the actuator system 200 may be built. In one embodiment, as best shown in FIG. 3, the substrate 206 may be relatively narrow, configured only to provide support for the actuator system 200. In other embodiments, the substrate 206 may provide a substrate for other circuitry as well, such as the control circuitry 26 and/or the drivers 22, 24. The substrate 206 may comprise any of a variety of materials, such as silicon.

The two actuators 202, 204 are illustrated in an in-line configuration. As used herein, in-line refers to an arrangement of a plurality of actuators that are generally aligned and do not overlap one another. One characteristic of an in-line configuration is that the actuator system's percent range-of-motion cannot exceed the greatest percent range-of-motion of any individual actuator. In other words, if two in-line actuators have ranges-of-motion of 2% and 10%, then the two actuators arranged in-line will have a range-of-motion of less than 10%. In contrast, an overlapping configuration (discussed at greater length below) is a different arrangement for a plurality of actuators, wherein the actuators overlap over at least a portion of their length. One characteristic of an overlapping configuration is that the actuator system's percent range-of-motion may be designed to be greater than that of any individual actuator. For example, if two actuators each have a range-of-motion of 5%, then the two actuators in an overlapping configuration may have a range-of-motion greater than 5%. Of course, in other embodiments, other geometric arrangements of the actuators may be used.

The two actuators 202, 204, as described above, may comprise any of a variety of shape memory materials. In one embodiment, the two actuators 202, 204 each comprise ceramic-based shape memory materials that may be cycled by the application of an electric field. In other embodiments, different shape memory materials may be used for each of the two actuators 202, 204.

Figure 4:
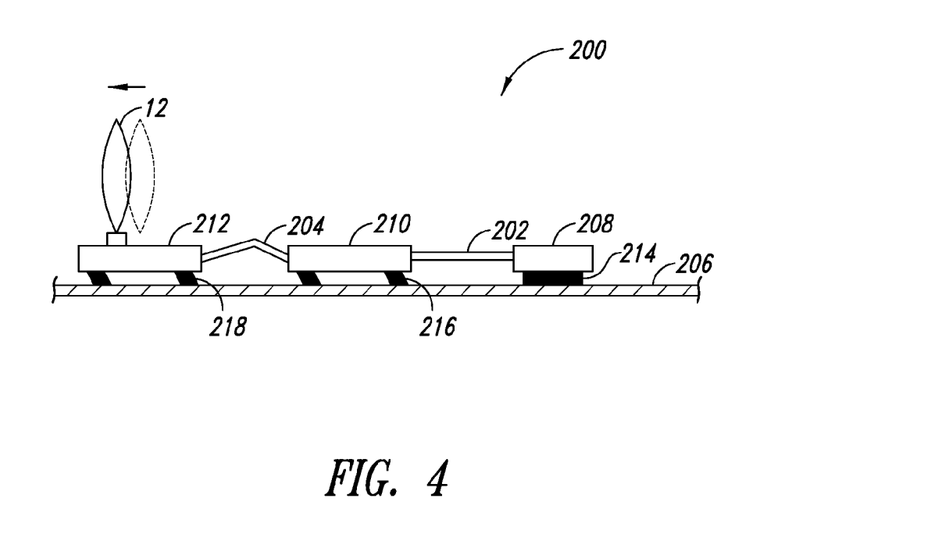
FIG. 4 is a side schematic view of the shape memory actuator system of FIG. 2, in which one actuator has been actuated.
Figure 5:
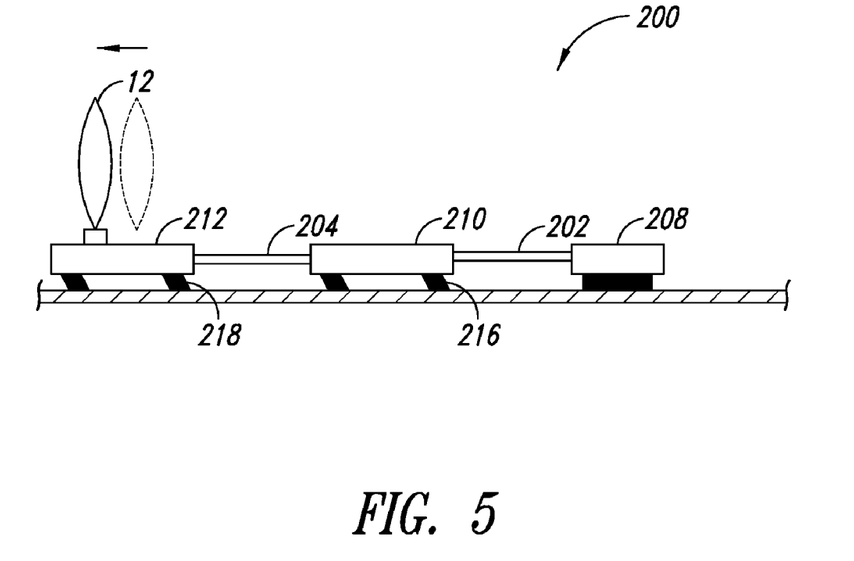
FIG. 5 is a side schematic view of the shape memory actuator system of FIG. 2, in which two actuators have been actuated.

Regardless of the particular shape memory material employed, each of the two actuators 202, 204 may have a first, relatively bent shape (as illustrated in FIG. 2), and a second, relatively straightened shape (as illustrated in FIGS. 4 and 5). Of course, in other embodiments, the actuators 202, 204 may have more complex shapes. For example, in one embodiment, the actuators 202, 204 may have a first shape comprising a helix, a Z-shape, a wave shape, etc., and a second shape that may be partially bent or straight, or that is otherwise elongated with respect to the first shape.

In one embodiment, each of the actuators 202, 204 may be linearly actuatable, such that an effective length of the actuators 202, 204 measured along an elongate axis L of the substrate 206 varies as the actuators 202, 204 cycle between the first and second shapes. In one embodiment, each of the actuators 202, 204 may also be independently actuatable, such that either of the actuators may be actuated without actuating the other. The actuation/cycling of the actuators 202, 204 will be discussed in greater detail below with reference to FIGS. 4 and 5.

The actuator system 200 may further comprise a plurality of platforms 208, 210, 212 that couple the actuators 202, 204 to each other, to the substrate 206, and to the focus lens 12. In one embodiment, the plurality of platforms 208, 210, 212 may comprise relatively stiff coupling members. For example, the platforms 208, 210, 212 may be formed from relatively thick portions of silicon. Such silicon may have been etched from or deposited atop the substrate 206.

In one embodiment, the platforms 208, 210, 212 may in turn be coupled to the substrate 206 by coupling members 214, 216, 218, respectively. The coupling member 214 between the platform 208 and the substrate 206 may be relatively robust, permitting little if any relative movement between the platform 208 and the substrate 206. Thus, in one embodiment, the platform 208 may serve as an "anchor" for the actuator system 200, remaining fixed as the focus lens 12 is moved.

In contrast, the coupling members 216, 218 between the platforms 210, 212 and the substrate 206 may be relatively thin pieces of material. These thin coupling members 216, 218 may be deformable, such that the platforms 210, 212 may easily move relative to the substrate 206 upon actuation of one or both of the actuators 202, 204. In one embodiment, the coupling members 216, 218 may be formed from thin portions of silicon, patterned during the manufacture of the actuator system 200. In another embodiment, the coupling members 216, 218 may have been deposited on the substrate 206. Other materials and manufacturing methods for the coupling members 216, 218 may also be used.

In other embodiments, platforms need not be incorporated into the actuator system 200. For example, each of the actuators 202, 204 may be coupled directly to one another, and at least one of the actuators may be directly coupled to the substrate 206. In other embodiments, structures coupled between the actuators 202, 204 need not comprise platforms.

In order to couple the actuators 202, 204 to a driver (such as the F-driver 24), one or more of the platforms 208, 210, 212 may be coupled to electrical leads (not shown). These electrical leads may, for example, extend through the substrate 206 through the coupling members (e.g., vias) to the platforms. In one embodiment, by powering the electrical leads, an electric field may be generated across one or both of the actuators 202, 204 in order to actuate them. In another embodiment, the electrical leads may be coupled to a heating element (e.g., a resistor) within one of the platforms or within the substrate 206 in order to actuate a thermally-actuatable shape memory actuator. In yet another embodiment, a light source (e.g., a laser) directed at an actuator to heat or otherwise activate it may be coupled to a driver by electrical leads.

FIGS. 4 and 5 illustrate the actuator system 200 having one and both of the actuators 202, 204, respectively, in the straightened shape. As illustrated, each of the actuators 202, 204 may be actuated from the bent shape to the straightened shape, effectively lengthening the actuators 202, 204 along the substrate 206. The actuators 202, 204 may also be actuated independently from one another in order to move the focus lens 12 different distances.

The actuators 202, 204 may be cycled between possible shapes by a variety of mechanisms. In one embodiment, for example, a driver may generate a current or voltage across one or both of the actuators 202, 204. In another embodiment, a driver may electrify and thereby heat one or more heating elements in order to thermally actuate one or both of the actuators 202, 204. In yet another embodiment, a driver may cause an emitter to generate acoustic or other energy that excites one or both of the actuators 202, 204. In still another embodiment, a driver may cause a light source to strike, and thereby heat or otherwise actuate one or both of the actuators 202, 204.

FIGS. 4 and 5 further illustrate how the coupling members 216, 218 may deform and elongate as the actuators 202, 204 take on their straightened shapes. It may be seen that as more actuators are coupled in-line, the platforms toward the end of that line may displace a relatively large amount causing greater deformation and stress for the respective coupling members.

Description of Another Exemplary Actuator System

Figure 6:
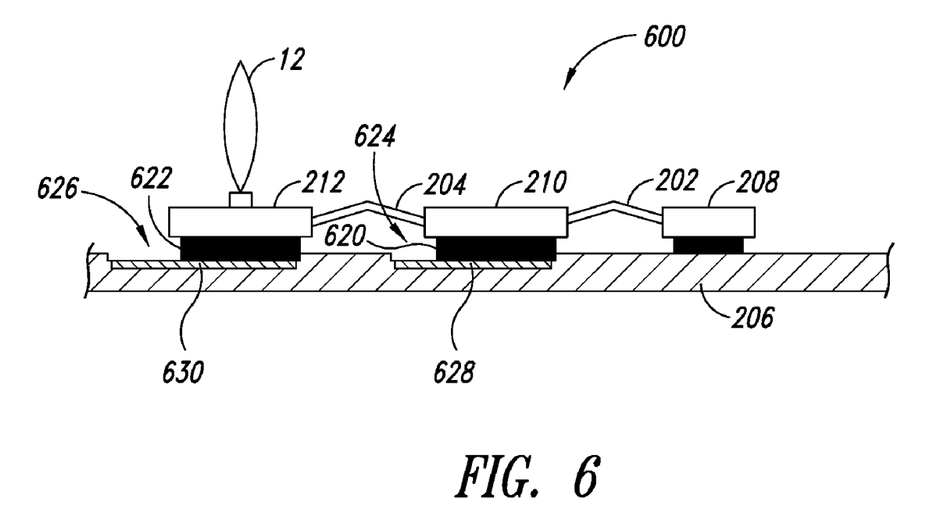
FIG. 6 is a side schematic view of a shape memory actuator system coupled to a lens, according to another illustrated embodiment.
Figure 7:
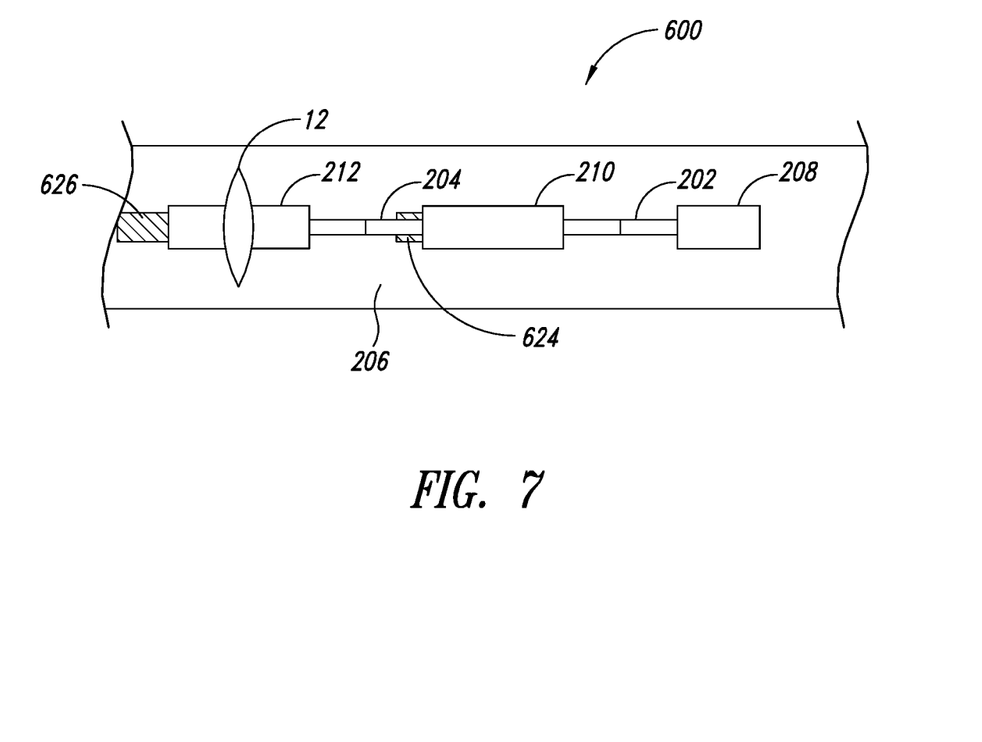
FIG. 7 is a top view of the shape memory actuator system of FIG. 6.
Figure 8:
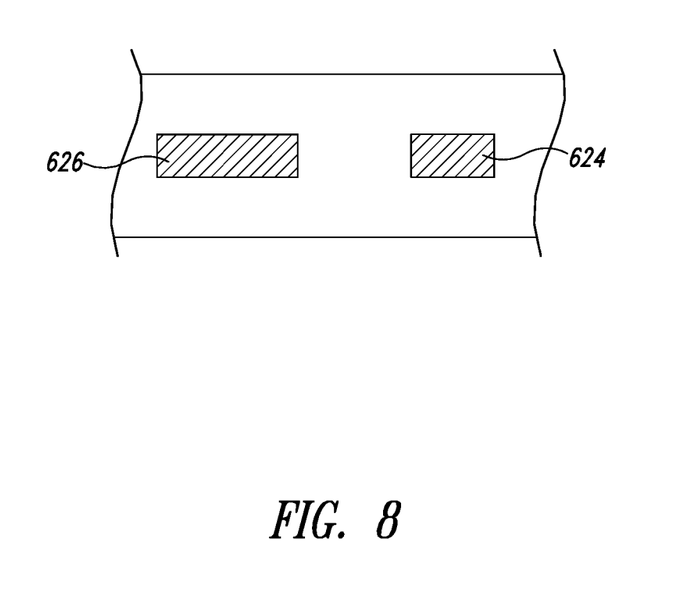
FIG. 8 is a top view of a substrate of the shape memory actuator system of FIG. 6.

As illustrated in FIG. 6, another actuator system 600 may also be used, including two actuators 202, 204 arranged in-line on a substrate 206. FIG. 7 is a top view of the actuator system 600, and FIG. 8 is a top view of just the substrate 206 of the actuator system 600. Many of the components of the actuator system 600 may be configured similarly to corresponding components of the actuator system 200. However, the platforms 210, 212 of the system 600 are coupled to the substrate 206 in a different manner than the platforms 210, 212 of the actuator system 200.

In one embodiment, the platforms 210, 212 are coupled to the substrate 206 by rails 620, 622, respectively. Each rail 620, 622 may be mounted within a slot 624, 626 formed in the substrate 206. The rails 620, 622 may comprise a variety of different structures to enable relative motion between the substrate 206 and the platforms 210, 212. In one embodiment, the rails 620, 622 comprise elongate members having a relatively smooth, bottom surface facing the substrate 206. In another embodiment, the rails 620, 622 may include one or more protrusions extending into or out of the plane of FIG. 6 that may engage the substrate 206. In still another embodiment, the rails 620, 622 may include one or more ball bearings that facilitate a sliding motion between the substrate 206 and the platforms 210, 212.

The slots 624, 626 may be configured to generally correspond to and receive the corresponding rails 620, 622. In one embodiment, the slots 624, 626 may simply comprise depressions in the substrate 206. In another embodiment, the slots 624, 626 may also include one or more openings to engage protrusions extending from the rails 620, 622.

The rails 620, 622 and corresponding slots 624, 626 may be configured to enable the platforms 210, 212 to slide relative to the substrate 206. In one embodiment, the slot 626 may be longer than the slot 624 due to the wider range of motion that the slot 626 must accommodate. Indeed, when an actuator system includes in-line actuators, slots that are located farthest from the anchor may generally be made longer than those nearest the anchor.

The slots 624, 626 may further include electrically conductive material 628, 630 lining at least a portion of the slots 624, 626. The electrically conductive materials 628, 630 may, for example, comprise copper, silver, or doped silicon. The slots 624, 626 may further be coupled by electrical leads (not shown) to a driver. In one embodiment, the electrical leads may be coupled across the electrically conductive material 628, 630. By powering the electrical leads, an electric field may be generated across one or both of the actuators 202, 204 in order to actuate them. In another embodiment, the electrical leads may heat the electrically conductive materials 628, 630 (which may be resistors) in order to actuate a thermally-actuatable shape memory actuator. Other configurations for cycling the actuators 202, 204 may also be implemented.

As illustrated, the slots 624, 626 are aligned with the axis F to move the focus lens 12 towards and away from the image pickup 16 along that axis F. In other embodiments, however, an actuator system may enable one or more lenses to follow a non-linear path. For example, the lenses may be positionable along an arcuate, zig zag or spiral track, enabling the lenses to be rotated away from an optical axis with the image pickup 16 as well as moved towards and away from the image pickup 16. In such an embodiment, the non-linear path may be formed by one or more slots or tracks through which one or more actuators may drive the lenses. Thus, in particular imaging conditions, a lens (e.g., a polarized lens or a zinc salinide lens) may be moved from a position that does not affect the image received at the image pickup 16 to a position in front of the image pickup 16 based on signals from the control circuitry 26.

Description of Another Exemplary Actuator System

Figure 9:
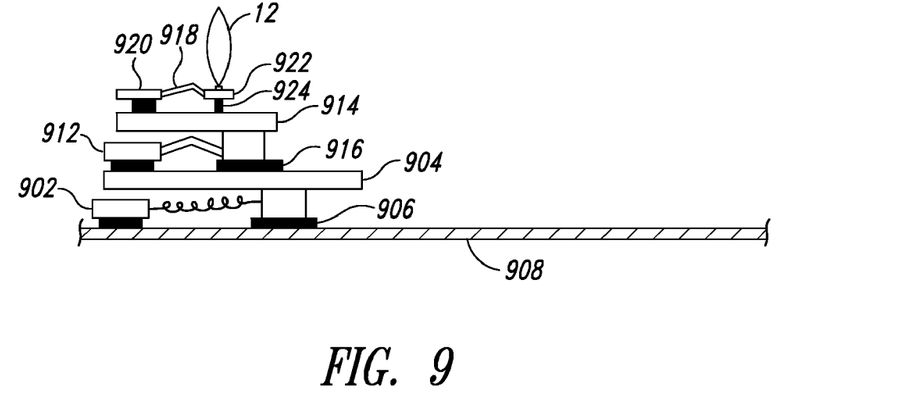
FIG. 9 is a side schematic view of a shape memory actuator system, according to another illustrated embodiment.

FIG. 9 illustrates yet another actuator system 900 that may be used to move a focus lens 12. In different embodiments, the actuator system 900 may be used to implement either the F-actuator system 20, the Z-actuator system 18, or both. As illustrated, the actuator system 900 comprises three actuators 901, 910, 918 arranged in an overlapping configuration.

The first actuator 901, which may be cycled between a helical and a relatively straight shape, may be coupled between platform 902 and platform 904. The second actuator 910, located atop the platform 904, may at least partially overlap the first actuator 901 and may be coupled between platform 912 and platform 914. The third actuator 918, located atop the platform 914, may at least partially overlap the second actuator 910 and may be coupled between platform 920 and platform 922. The actuators 901, 910, 918 may be configured generally similarly to the actuators 202, 204 discussed at length above. In one embodiment, each of the actuators 901, 910, 918 may be independently actuated and may comprise one or more shape memory materials.

The platform 902 may be coupled to the substrate 908 in a fixed manner, functioning as an anchor. The platform 904 may be coupled to the substrate 908 by a rail 906 in a manner similar to that described above with respect to FIG. 6. The platform 912 and the platform 914 may have a similar configuration, with the platform 912 fixed relative to the platform 904, and the platform 914 slidably coupled to the platform 904 by a rail 916. The platform 920 and the platform 922 may also have a similar configuration, with the platform 920 fixed relative to the platform 914 and the platform 922 flexibly coupled to the platform 914 by a coupling member 924.

Figure 10:
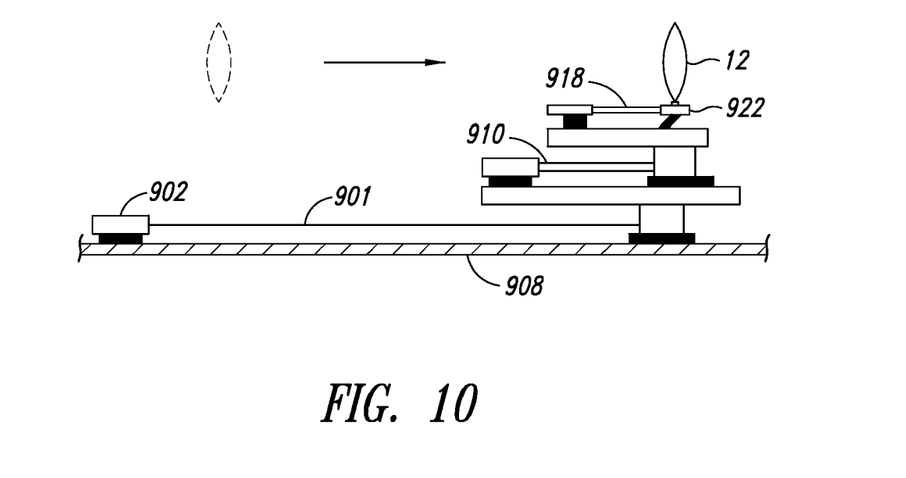
FIG. 10 is a side schematic view of the shape memory actuator system of FIG. 9, in which three actuators have been actuated.

Referring to FIG. 10, illustrating the actuators 901, 910, 918 in their effectively lengthened shapes, the actuators may move the focus lens 12 by a relatively large percentage of an unactuated distance (as shown in FIG. 9) between the focus lens 12 and the platform/anchor 902.

The actuators may also be arranged such that the first actuator 901 is configured to move the focus lens 12 a relatively large distance, the second actuator 910 is configured to move the focus lens 12 a smaller distance, and the third actuator 918 is configured to move the focus lens 12 a still smaller distance. Thus, in one embodiment, the three actuators 901, 910, 918 in this overlapping configuration may move the lens by smaller and smaller gradations.

Although each of the figures illustrates either overlapping or in-line configurations, it may be understood that different actuator systems may incorporate actuators arranged in a mixture of these configurations or in other configurations. For example, in one embodiment, a first plurality of actuators may be coupled together in-line, and coupled to a second plurality of actuators that are overlapping at least some of the first plurality of actuators.

In addition, although each of the figures illustrates actuator systems coupled to only one lens, the actuator systems may, in other embodiments, include a plurality of lenses mounted to the platforms between the actuators. For example, in the actuator system 200, the platform 210 may, in one embodiment, have the zoom lens 14 mounted thereon. In such an embodiment, fewer drivers and actuator systems may be needed.

Description of an Exemplary Method for Operating an Imaging Apparatus

Figure 11:
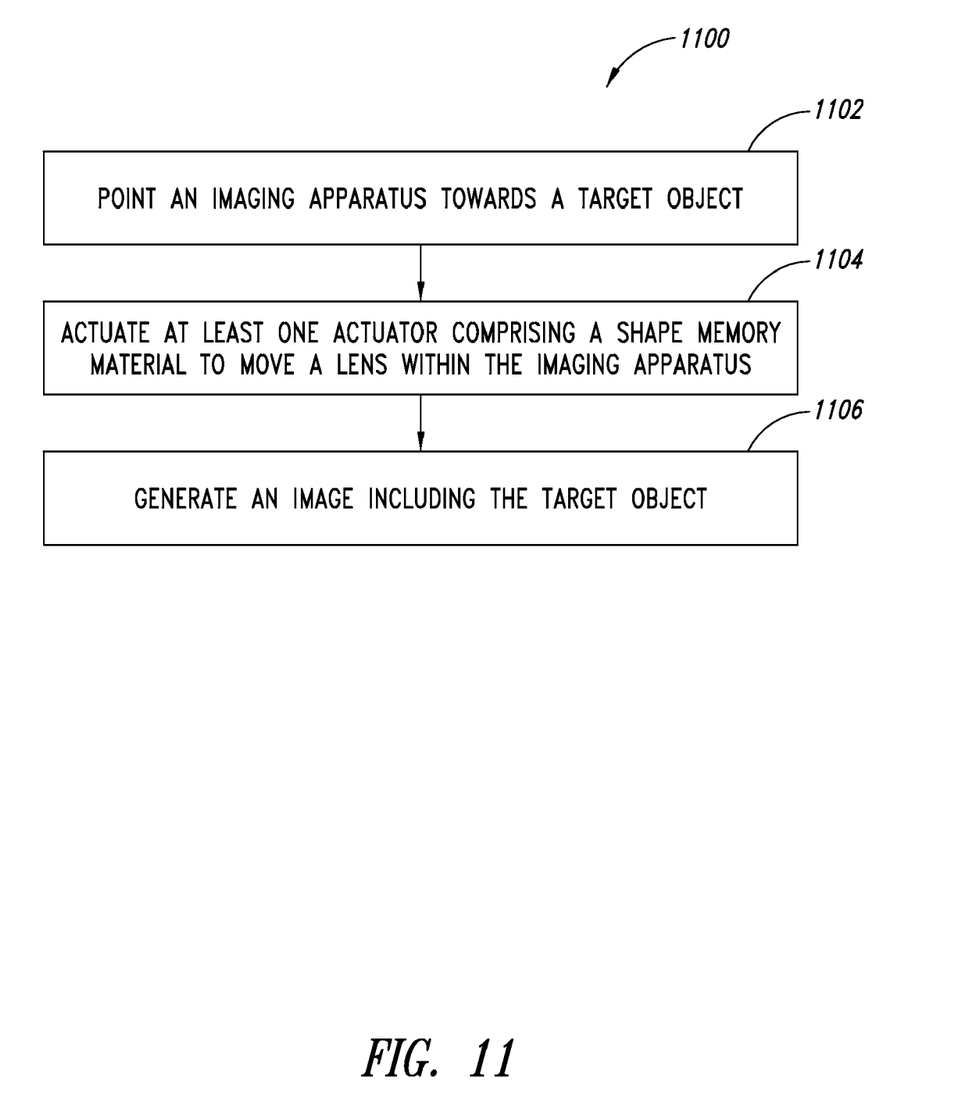
FIG. 11 is a flow diagram illustrating a method of operating an imaging apparatus having a shape memory actuator, according to one illustrated embodiment.

FIG. 11 illustrates a flow diagram for a method 1100 of operating an imaging apparatus having at least one shape memory actuator, according to one embodiment. This method 1100 will be discussed in the context of the imaging apparatus 10 of FIG. 1. However, it may be understood that the acts disclosed herein may also be executed using a variety of imaging apparatuses having shape memory actuators.

The method begins at 1102, when an imaging apparatus 10 is pointed towards a target object. This act may, of course, be performed in a variety of contexts. For example, in one embodiment, a photographer may point the imaging apparatus 10 at a target object. In another embodiment, a camera operator may point a video camera to capture a scene. In yet another embodiment, the imaging apparatus 10 may be pointed at a target object by an automated system. The term, target object, may refer to a broad range of objects that may be captured by an imaging apparatus, including people, scenery, inanimate objects, etc.

At 1104, at least one actuator comprising a shape memory material is actuated in order to move a lens within the imaging apparatus 10. As illustrated in FIG. 1, in one embodiment, the focus lens 12 may be moved by the F-actuator system 20, which includes at least one shape memory actuator. The zoom lens 14 may also be moved by the Z-actuator system 18 which includes at least one shape memory actuator. The lens may be moved at least partly under user control, or, in another embodiment, may be moved based on an automated determination made by the control circuitry 26.

For example, a user may direct movement of the zoom lens 14 by manipulating the zoom selector 30. Electrical or optical signals from the zoom selector 30 may be received by the control circuitry 26, which may, in turn, control the Z-driver 22 in order to actuate at least one actuator in the Z-actuator system 18.

In another embodiment, the control circuitry 26 may automatically cause movement of the focus lens 12 based on an autofocus determination. For example, an active autofocus system may make an autofocus determination by causing a signal (e.g., an electromagnetic signal, a sound wave, etc.) to be emitted from the imaging apparatus 10, detecting a reflected signal, and determining an approximate distance between the imaging apparatus 10 and the target object based on the reflected signal. The distance may be determined in a variety of ways. In one embodiment, a length of the trip from the imaging apparatus 10 to the target object and back to the imaging apparatus 10 may be timed by the control circuitry 26. In another embodiment, characteristics of the reflected signal itself may be analyzed in order to determine the distance. Once an approximate distance to the target object has been determined by the control circuitry 26, a movement distance/location for the focus lens 12 may be calculated based, at least in part, on the determined distance. For example, in one embodiment, the control circuitry 26 may use a stored table correlating distances to target objects with locations for the focus lens 12. In another embodiment, the control circuitry 26 may access one or more equations correlating distances to target objects with locations for the focus lens 12.

In a passive autofocus system, the control circuitry 26 may make an autofocus determination by computer analysis of an image of the target object. In one embodiment, the control circuitry 26 may automatically determine which of a plurality of objects in an image generated by the image pickup 16 is the target object and then determine whether or not the target object is in focus. In other embodiments, the entire image may be analyzed by the control circuitry 26 to determine whether or not it is in focus. Such computer analysis may include determining whether or not the image is in focus by any of a variety of algorithms. The control circuitry 26 may then move the focus lens 12 in a feedback loop to achieve a focused image at the image pickup 16.

At 1106, an image may then be generated including the target object. The image may be generated in a variety of ways. In one embodiment, the control circuitry 26 may receive a plurality of electrical signals representative of the image from the image pickup 16 and may store these signals in memory. The control circuitry 26 may store the image in a variety of computer-readable formats (e.g., RAW format, JPEG format, PNG format, BMP format, etc). In another embodiment, the control circuitry 26 may cause the image pickup to generate an analog image of the target object by, for example, operating a shutter to expose at least a portion of the image pickup.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. An imaging apparatus, comprising:
   an image pickup;
   a lens having an optical axis; and
   at least two actuators including a first actuator and a second actuator, the first actuator having a first end movably and physically coupled to the second actuator and having a second end physically coupled to the lens, the first actuator arranged to move the lens, relative to the image pickup, along the optical axis of the lens, the second actuator arranged to move the first actuator, relative to the image pickup, in a direction that is parallel to the optical axis of the lens, the at least two actuators being comprised of a shape memory material.

2. The imaging apparatus of claim 1, further comprising:
   a driver coupled to the at least two actuators and configured to actuate the at least two actuators.

3. The imaging apparatus of claim 2 wherein the driver is configured to actuate the at least two actuators independently of one another.

4. The imaging apparatus of claim 3, further comprising:
   control circuitry coupled to the driver and configured to control movement of the lens via the driver.

5. The imaging apparatus of claim 4, wherein the control circuitry is further configured to calculate a movement distance for the lens based at least in part on an autofocus determination.

6. The imaging apparatus of claim 5, wherein the control circuitry is further configured to cause the driver to actuate a subset of the at least two actuators based at least in part on the movement distance.

7. The imaging apparatus of claim 4, further comprising:
   a zoom selector actuatable by a user;
   wherein the control circuitry is configured to calculate a movement distance for the lens based at least in part on a signal from the zoom selector.

8. The imaging apparatus of claim 3, wherein the first actuator of the least two actuators and the lens are coupled together and are arranged such that actuation of the second actuator causes the first actuator and the lens to move relative to the second actuator.

9. The imaging apparatus of claim 1, wherein at least one actuator of the at least two actuators is comprised of a ceramic-based shape memory material.

10. The imaging apparatus of claim 1 wherein the first actuator and the second actuator are arranged in-line along a longitudinal axis that is generally parallel to an optical axis of the lens and further arranged such that actuation of the second actuator causes the first actuator and the lens to move relative to the second actuator, and wherein the direction of movement of the first actuator is generally along the longitudinal axis.

11. The imaging apparatus of claim 1 wherein the first actuator and the second actuator are overlapping with the first actuator of the at least two actuators coupled to the second actuator of the at least two actuators generally above the second actuator, and wherein the first and second actuators are arranged such that actuation of the second actuator causes the first actuator to move relative to the second actuator in a first direction generally along a longitudinal axis that is generally parallel to an optical axis of the lens and causes the lens to move relative to the second actuator generally along the optical axis of the lens.

12. The imaging apparatus of claim 11 wherein the first actuator and the second actuator are arranged to move the lens along the optical axis by differing distances such that actuation of one of the first actuator or the second actuator moves the lens by a first distance (D) and actuation of the other one of the first actuator or the second actuator moves the lens by a second distance (d) which is smaller than the first distance (d<D).

13. The imaging apparatus of claim 1 further comprising a platform movable with respect to the image pickup and having the at least two actuators coupled to each other via the platform, the first actuator and the lens arranged to move with movement of the platform, the second actuator arranged to move the platform.

14. The imaging apparatus of claim 13, further comprising:
    a substrate carrying the at least two actuators and the platform; and
    at least one deformable coupling member coupling the platform and the substrate together and supporting the platform on the substrate.

15. The imaging apparatus of claim 13, further comprising:
    a substrate carrying the at least two actuators; and
    at least one rail mounted within a slot in the substrate and having the platform slidably coupled thereto, wherein the second actuator is arranged to slidably move the platform along at least a portion of the at least one rail.

16. The imaging apparatus of claim 1, wherein at least one actuator of the at least two actuators is comprised of a thermally-actuatable shape memory material.

17. The imaging apparatus of claim 1, wherein the lens is a zoom lens.

18. The imaging apparatus of claim 1, wherein the lens is a focus lens.

19. The imaging apparatus of claim 1, further comprising:
    an optical element at least partially transparent to light and movably positioned between a first position in an optical axis of the lens and a second position out of the optical axis of the lens; and
    at least a third actuator coupled to the optical element and configured to move the optical element between the first position and the second position, the at least second actuator being comprised of a shape memory material.

20. A method of operating an imaging apparatus, comprising:
    actuating a first actuator of at least two actuators comprising a shape memory material to move a lens within an imaging apparatus pointed toward a target object in a direction that is along an optical axis of the lens;
    actuating at least a second actuator comprising a shape memory material to move at least the first actuator in a direction that is parallel to the optical axis of the lens of the imaging apparatus; and
    generating an image including the target object.

21. The method of claim 20, further comprising:
    receiving user input corresponding to a desired level of zoom;

determining a movement distance for the lens based at least in part on the desired level of zoom, and wherein actuating at least a second actuator comprising a shape memory material to move at least the first actuator in a direction that is parallel to the optical axis of the lens of the imaging apparatus comprises actuating the second actuator based on the movement distance.

22. The method of claim 20 wherein actuating at least a second actuator comprising a shape memory material to move at least the first actuator in a direction that is parallel to the optical axis of the lens of the imaging apparatus further comprises:

determining whether the image including the target object is in focus; and actuating the second actuator to move the first actuator and the lens if the image is not in focus.

23. The method of claim 20, further comprising:

actuating at least a third actuator comprising a shape memory material to move an optical element within the imaging apparatus from a first position disposed along the optical axis of the lens to a second position outside of the optical axis of the lens, the optical element being at least partially transparent to light.

24. The method of claim 20 wherein actuating at least a second actuator comprising a shape memory material to move at least the first actuator in a direction that is parallel to the optical axis of the lens of the imaging apparatus, further comprises:

moving a platform having the first actuator of the plurality of actuators and the lens mounted thereon relative to the second actuator.

25. The method of claim 20 wherein actuating at least a second actuator of the plurality of actuators, further comprises:

moving a platform, interposing and physically coupled to the first and the second actuators of the plurality of actuators, relative to the second actuator.

26. A method of operating an imaging apparatus, comprising:

actuating at least one actuator comprising a shape memory material to move a lens within an imaging apparatus pointed toward a target object;

transmitting a signal towards the target object;

receiving a reflected signal from the target object;

determining a target distance between the imaging apparatus and the target object based at least in part on the reflected signal;

calculating a movement distance for the lens based at least in part on the target distance;

actuating the at least one actuator based on the movement distance; and generating an image including the target object.

27. The method of claim 26, further comprising:

determining whether the image including the target object is in focus; and actuating a second actuator comprising a shape memory material to move the lens if the image is not in focus.

28. The method of claim 26 wherein the lens is moved in a direction that is parallel to an optical axis of the lens, and further comprising:

actuating at least a second actuator comprising a shape memory material to move an optical element within the imaging apparatus from a first position disposed along the optical axis of the lens to a second position outside of the optical axis of the lens, the optical element being at least partially transparent to light.

* * * * *